United States Patent [19]

Gemar et al.

[11] 4,434,953
[45] Mar. 6, 1984

[54] DUAL SPOOL PRETENSIONER

[75] Inventors: Charles Gemar, Mound; Robert L. Meisch, Minneapolis, both of Minn.

[73] Assignee: The Firestone Tire & Rubber Company, Akron, Ohio

[21] Appl. No.: 238,070

[22] Filed: Mar. 2, 1981

[51] Int. Cl.³ .................... A62B 35/02; B65H 75/48
[52] U.S. Cl. .................... 242/107; 242/107.4 R; 280/806
[58] Field of Search ............. 242/107.4 R–107.4 E, 242/107; 280/806, 807, 803; 297/478, 480

[56] References Cited

U.S. PATENT DOCUMENTS

| | | | |
|---|---|---|---|
| 3,077,324 | 2/1963 | Strickland, Jr. | 244/122 B |
| 3,178,136 | 4/1965 | Bayer | 244/122 B |
| 3,189,296 | 6/1965 | Wrighton | 242/107.4 |
| 3,220,668 | 11/1965 | Martin | 242/107.4 A |
| 3,335,975 | 8/1967 | Dick | 242/107.4 |
| 3,386,683 | 6/1968 | Howland | 242/107.4 |
| 3,531,061 | 12/1970 | Davies | 242/107.4 |
| 3,871,470 | 3/1975 | Schwanz | |
| 3,879,054 | 4/1975 | Lindblad | |
| 3,917,031 | 11/1975 | Doin | |
| 3,984,127 | 10/1976 | Bendler | |
| 4,006,644 | 2/1977 | Beier | 74/242.1 |
| 4,008,780 | 2/1977 | Bendler | 180/82 C |
| 4,014,479 | 3/1977 | Nilsson | 242/107.4 R |
| 4,053,119 | 10/1977 | Doin | 242/107.4 R |
| 4,056,242 | 11/1977 | Herrmann | 242/107.4 R |
| 4,061,291 | 12/1977 | Cunningham | 242/107 |
| 4,142,692 | 3/1979 | Andres | 242/107 |
| 4,151,967 | 5/1979 | Lindblad | 242/107.4 R |
| 4,164,336 | 8/1979 | Higbee et al. | 242/107.4 A |
| 4,176,808 | 12/1979 | Sasaki | 242/107.1 |

Primary Examiner—John M. Jillions
Attorney, Agent, or Firm—Miller, Morriss & Pappas

[57] ABSTRACT

A dual spool pretensioner serving dual spool retractors in a common frame by transversely projecting a piston element between the adjacent shaft extensions. The shaft extensions are upset as by knurling and a portion of the piston element is in an interference path with the upset portion of the shafts. The piston is cartridge driven by pyrotechnic means and the portion of the piston means, in the guided interference path with the upset, is deformed during passage between the shafts so that the shafts and the reels attached thereto are positively rotated and webbing on such reels is wound thereon. The pretensioner is removably attached by its case to the retractor frame and stresses in the pretensioner are thereby transmitted through the retractor frame to the mounting thereof.

4 Claims, 4 Drawing Figures

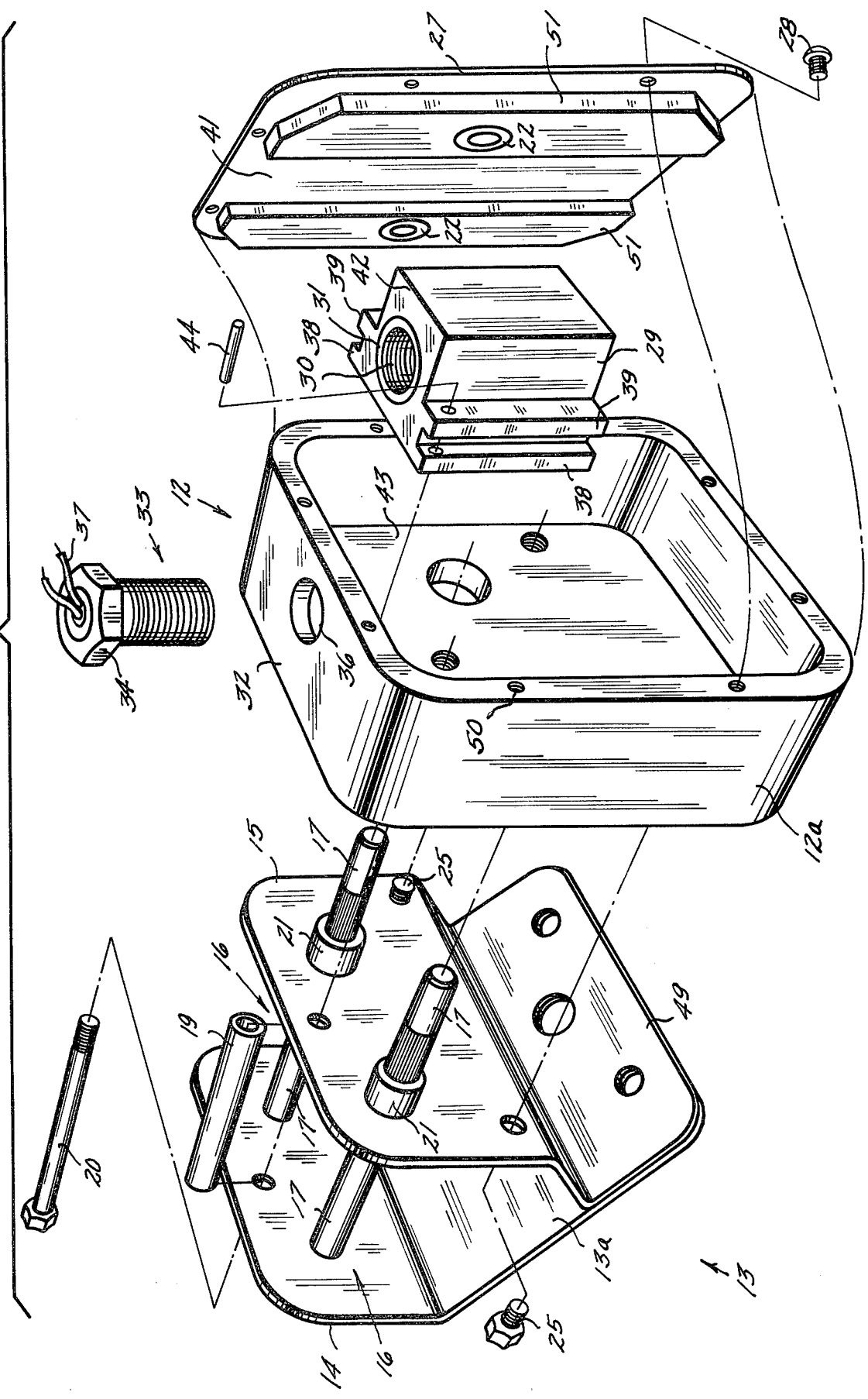

DUAL SPOOL PRETENSIONER

The present invention is an improved pretensioner for dual spool retractors for use in safety harness as used in vehicles such as automobiles to control the flow of safety belt or webbing from the reel receptacles and back to the reel receptacles. In the present invention, the dual spool retractors are in a common frame in adjacent spaced-apart relation and the pretensioner is attached to the retractor frame in a compact construction and the pretensioner carried a pyrotechnic gas generating propellant cartridge which is responsive to the sensing of sudden acceleration and deceleration of the vehicle as would occur under emergency or impact conditions. The pretensioner acts on both of the reels picking up slack in the belt, webbing, or harness.

The reels of retractors are usually locked under emergency conditions as by movement of a pawl to interfere with a rotating ratchet and prevents withdrawal movement of the reel. The pawl, in turn, is acted upon by a deceleration or acceleration sensor when emergency situations occur as by impact, braking, or unusual acceleration resulting in force at or above the sensitive level of the sensor. In most vehicle sensitive situations, this sensing is achieved by displacement of a pendulum-like device. At the instant of an emergency situation, if there is slack or looseness in the webbing or safety belt from tension lock-out, from elongation, from relaxed rewind tension or combinations of these factors in the emergency, the user is projected by inertia until the slack in the webbing belt is removed. Pretensioners are accordingly desirable to take up the slack in the webbing in the event of an emergency and snug the webbing against the user and even urge the user into closer contact with seat and seat back. A collateral result is to counteract webbing elongation. In short runs of webbing or harness, the elongation is minimal but with long runs webbing the problem is magnified. The pretensioner is operative independently of the pawl lock mechanism but is activated by a selected threshold of sensitivity and retracts the webbing with a selected force wall beyond the light retraction tension present in the usual return springs found in rewind retractors for safety belt webbing.

The pretensioners in the present invention act upon dual spool retractors mounted in a common frame and the pretensioner is attached to the frame and extends or augments the journal support of the retractor reels or spools. The pretensioner drives the reels or spools upon discharge of a pyrotechnic cartridge. The driving is positively achieved by a piston having surfaces which engage knurled or tooth-forming portions of the reel shafts in any selected sequence and under fully guided conditions. As the pyrotechnic gases expand, the piston moves from a guided rest position through a guided path between the shafts and with the resulting tooth-forming. The piston is deformed by the engagement of the knursl as the piston is projected between the knurled shafts and this forms the tooth-like cuts as the piston moves by. The expandable elements such as cartridge and piston are easily replaced and the unit is useable in a wide variety of specific harness applications.

Prior Art

The prior art evolution of pretensioning commences with harness tightening devices in aircraft seat and safety harness structures in which a gas of ballistic or pyrotechnic origin operates a rotary actuator or reel to wind up or retract a piece of webbing or harness on the reel. Such gas operated reels or spools are believed to have evolved from ballistic seat ejection devices and procedures. In general, such devices drive a threaded element which translates the linear motion of a piston or projectile to provide rotation to the harness reel and consequent tightening of harness. In at least one such unit (R. J. Wrighton, et al, U.S. Pat. No. 3,189,296) two reels are acted upon simultaneously where a piston causes a gear to rotate and the gear, in turn, drives a gear train operably connected to two reels or spools. In the U.S. Pat. No. 3,386,683 to O. E. Howland, a ballistic charge drives a rack and gear train and this rotates a reel and retracts webbing on the reel. In some tensioning devices, such as the device of Schwanz, et al, U.S. Pat. No. 3,871,470, the seat belt webbing is terminally attached to pistons in cylinders and upon actuation of the cylinder the piston tightens up on the webbing and in the reel version a torsion bar slips when webbing tension exceeds the strain limit of the torsion bar. In the U.S. Pat. No. 3,984,127 to H. Bendler, et al, a rotary piston via a coupling bushing drives a reel for tensioning safety belts and the piston was driven by a ballastic or pyrotechnic cartridge. In the U.S. Pat. No. 4,006,644 to E. Beier a soft projectile on the end of a piston rod is gas-driven through a helix on the axis of a reel for driving. The gas is generated by a pyrotechnic cartridge. Here, the soft metal is displaced to mate the lands and grooves of the helix tube axle. The foregoing devices mostly apply a pyrotechnic force activating movement axially of the reel shaft or driectly moves a rotating piston. The present invention, as will be seen, improves the concept of ballistic or pyrotechnic pretensioning by providing a piston (destructing upon use) acting transversely between a pair of shafts to rotate two adjacent retractor reels with any desired sequence in tensioning and in which the piston is thereby deformed to provide positive drive of the two shafts and the reels or spools served thereby. For example, both reels may be driven simultaneously at the start or one reel may engage ahead of the other.

The principal object of the present invention is to provide a pyrotechnic webbing pretensioner for dual spool retractors and in which the pretensioner assembly is compactly attached to the retractor frame and the pretensioner assembly orients the piston, supports the ballistic cartridge, and provides journal support on both sides of the retractor shaft projecting into the pretensioner structure. After use, the piston and cartridge are replaced. Other objects, such as ease of replacement, inspection, and attendant economies in use, as well as simplicity of construction, will be appreciated by those skilled in the art as the description proceeds.

Comfort and convenience to the users of seat belts is regarded by vehicle safety advocates and manufacturers as essential to adoption and use of safety belt equipment in all vehicles. This is even more important in automobiles where consumer resistance to use is related to factors of comfort, convenience and finally, safety. Passive restraint systems in vehicles seek to provide a means of compelling the use of the safety restraints. For the most part, in such situations, more belting is required to achieve the necessary automatic manipulation or depolyment of the safety webbing or harness. The need for more webbing and extreme distances between extended and retracted condition of the webbing has called for means of serving the webbing out at different distances for different portions of the webbing and many times from points proximate to each other. Plural spool retractors have provided such a convenience and have even provided selected sequencing of retraction and locking. To provide satisfactory comfort by minimization of tension of the webbing against the body of the user and to allow for normal body movement, has been difficult since the relaxation of the webbing or belting at substantial extension creates a condition threatening maximum safety at the time of crisis. Accordingly, a pretensioner serving plural or dual spool retractors is desirable if economically feasible. The present invention shows how to achieve this desirable and unobvious result and expresses a simple, compact, and component replaceable structure having the capability for sequence control as between the pretensioning of one reel and the pretensioning of the other.

IN THE DRAWINGS

FIG. 4 is an exploded view indicating the simplicity and compactness of the pretensioner on the dual spool frame.

GENERAL DESCRIPTION

In general, the present invention is a pretensioner for dual spool safety belt retractors as used in vehicles for the safety of users and occupants and both reels or spools are in manipulative attachment to webbing or belting extending therefrom and around the lap and shoulders of such users and occupants. A pair of reel shafts are provided in spaced-apart parallel offset relation and intermediate the ends of the shafts there is provided a knurled section. The knurled portions of the shafts extend outboard of a retractor reel and frame. A pretensioner case is provided which supports the extended shafts in operative and journalled relation so as to locate the knurled sections in spaced-apart parallel adjacent relation. The case is attachable to the retractor or reel. The case includes a chamber. The chamber is adapted to receive pyrotechnic or ballistic means and the pyrotechnic means is removably inserted in the chamber. The pyrotechnic means is initiated by a squib forming a portion of the cartridge and the squib is activated by an electrical impulse from a sensing device monitoring the sudden change of movement of the vehicle. The sensor is not a part of the present invention. A piston means is operably engaged against the chamber and surrounding the chamber and pyrotechnic means and the piston means is alignably journalled and guided to move between the two shafts and the piston means includes an interference fit with the knurled portions of the shafts whereby, upon movement of the piston projected by the initiation of the pyrotechnic means, the shafts are both rotated. The amount, order or sequencing of the rotation of the shafts is established by the selected extent and position of the interference fit portion of the piston. The piston, upon completion of its stroke, is deformed by the knurling of the shafts to provide a positive drive of the shafts. The metal displacement is a tooth-forming deformation as the piston progresses in the interference path. A shear pin between piston and case secures the piston in a ready position for breakaway relation to the case upon initiation of the pyrotechnic means and the pin holds the piston normally out-of-contact with the knurled portion of the shafts. A chamfered edge provides a ramp lead to piston contact with the knurls. Thus, two safety belt retractor reels are operated by means of a single stroke of a piston in a compact and replaceable component package. The material of the interference portion of the piston is selected in accord with the character and amount of deformation sought upon activation. In general, lead deforms easily but may be stripped or shredded. Aluminum appears to best and various alloys and other metals are satisfactory under selected conditions.

SPECIFIC DESCRIPTION

Figure 1:
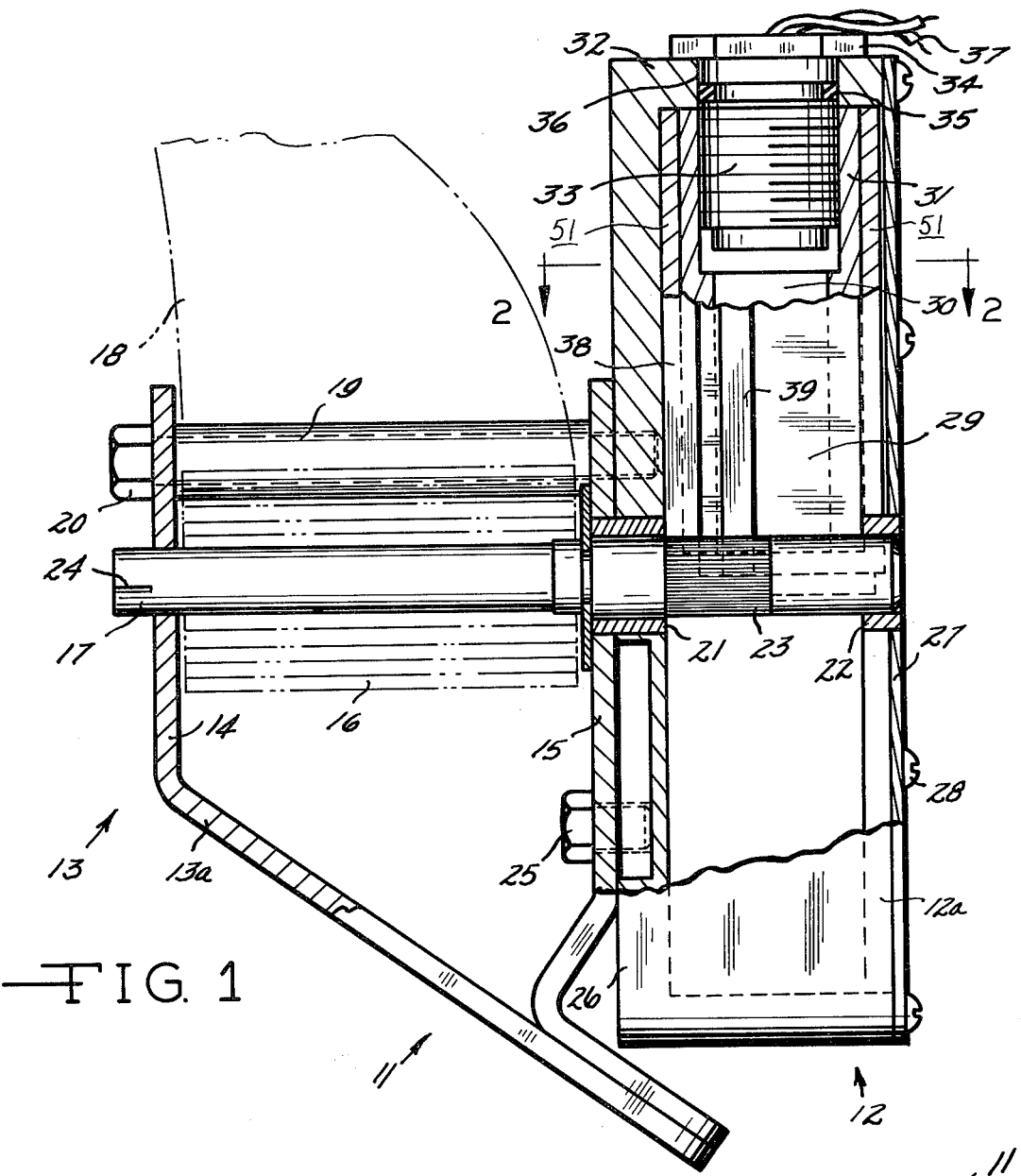
FIG. 1 is a front elevation view of a dual spool retractor and pretensioner with reels in its frame and partially cut away to indicate that the shafts of the reels extend into the adjacent partially cut away pretensioner case.

Referring to the drawings and with first particularity of the FIG. 1, the dual spool retractor with pretensioner 11 is shown and includes the pretensioner structure 12 secured to the dual spool retractor 13, retractor frame 13a. The retractor frame 13a is generally channel-shaped, includes two upstanding and spaced flanges 14 and 15 joined in the mounting web of the frame 13a and these flanges 14 and 15 provide journal support for the reels 16 and their shafts 17 which extend therethrough. The webbing 18 on the reels 16 is trained away from the frame 13a in paths determined by the selected deployment of the webbing 18. The spacer tube 19 assures desired strength in the flanges 14 and 15 of the frame 13a to prevent deformation or collapse of the frame 13a. The tubes 19 are secured in compression relation between flanges 14 and 15 by the bolts 20. As can be seen, the shafts 17 extend outboard of the retractor frame 13a and project into the pretensioner case 12a. In passage through the case 12a at the flange 15, they are supported by a journal or bushing element 21 and the outboard extension of the shafts 17 in the pretensioner case 12a is supported in the outboard bushing or bearing 22. Intermediate the ends of the shafts 17 is a knurled portion 23. The knurled portion 23 forms tooth-like integral projections or crests and intermediate dips or roots. Thus, the knurled portions 23 present cylindrical upset surfaces with substantially increased frictional coefficients over the main portion of the shafts 17. As will be seen, the shafts 17 are in spaced-apart adjacent journalled relation and the diametrical slot 24 in the end of the shafts 17 will be understood to be operably attached to a retractor spring (not shown) and normally urging the reels 16 to pick up the webbing 18 when it is relaxed or in release of any spring lock-out structure. The axes of the two shafts 17 are offset from each other but are in spaced-apart adjacent parallelity. The bolts 25 provide means to removably fasten the pretensioner case 12a to the flange 15 of the frame 13a.

The pretensioner case 12a is a shallow shell 26 which is closed by the cover 27 of the case 12a. The cover 27 is apertured to support the bushings 22 and support shafts 17. The case 12a includes piston guide means, as will be seen, and the cover 27 also is provided with piston guide means better visualized in the FIG. 2. The cover 27 is screwed to the shell 26 by the screws 28. A piston 29 is positioned in the shell 26 in case 12a intermediately poised between the shafts 17. The piston 29 includes a cylindrical hollow portion or chamber 30. The chamber 30 is movable on a tubular sleeve 31 and the tubular sleeve 31 butts against the pretensioner case wall 32. The end of the sleeve 31 adjacent the case wall 32 is internally threaded and into the threaded opening is a matingly threaded pyrotechnic cartridge 33. The cartridge 33 thus is removable and extends into the chamber 30. The cartridge 33 includes a flanged head 34 and an annular seal 35 which seals against the cartridge opening 36. This provides a gas-tight seal in prevention of the pyrotechnic generated gases escaping through the cartridge opening 36. Initiator wires 37 extend from cartridge 33 and are attached to an initiator such as an electrical squib potted in the cartridge 33. The electrical leads 37 are attached to an electrical source in a circuit closed by a suitable sensor and the sensor and circuit are not a part of the present invention. As will be appreciated, the lower end of the piston 29 is closed so that the chamber 30 is allowed to expand as the pressure of the pyrotechnic generated gas from the cartridge 33 drives the piston 29 (downwardly as shown in FIG. 1) in its guides in the case 12a and cover 27 journalled on the tubular sleeve 31. The surfaces 38 and 39 on the piston 29 are in interference fit with the knurled portion 23 of the shafts 17 and this relationship is better understood by reference to FIG. 2.

Figure 2:
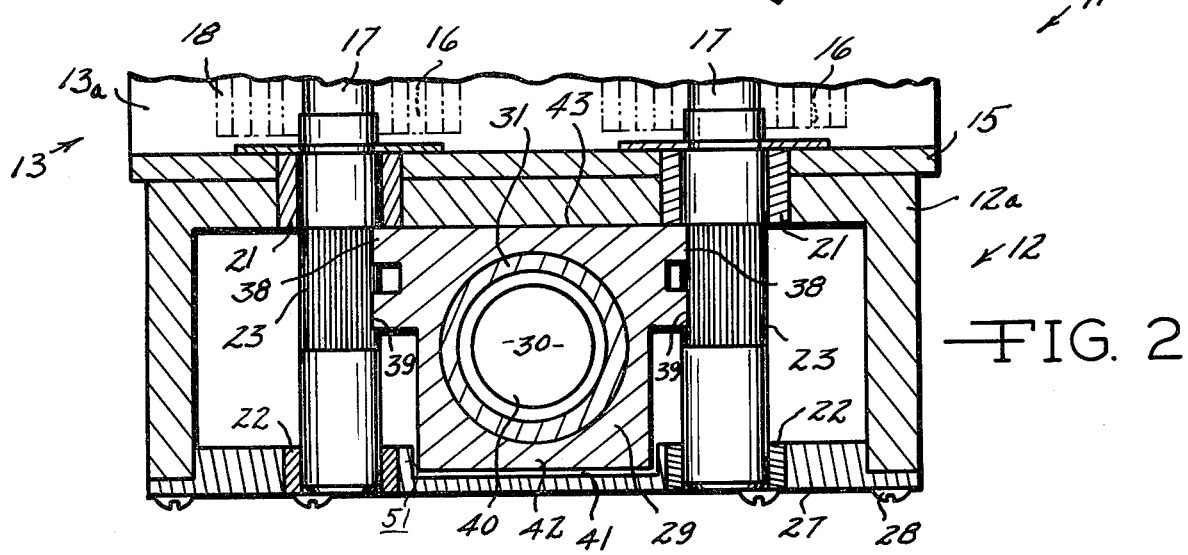
FIG. 2 is a full section top plan view taken on the line 2—2 of FIG. 1 and showing the piston means poised between the knurled sections of the reel shafts and showing the pyrotechnic chamber and concentric expansion of chamber and cylinder of the piston.

In FIG. 2 the lands created by the raised surfaces 38 and 39 of the piston 29 are seen and the piston 29 is to be driven between the shafts 17 and into interference engagement with the knurled portions 23. The closed end 40 of the piston 29 is seen and the chamber 30 communicating gas to move the piston 29 is appreciated. The cover 27 is in guiding relation to the piston 29 at the dropped surface 41 which provides a running fit against rectilinear lobe or projection 42 of the piston 29. The flat surface 43 of the piston 29 opposite the lobe 42 is in a running fit against the case 12a. As will be seen, a shear pin is employed at assembly to retain the piston 29 in the raised position seen in FIG. 1.

Figure 3:
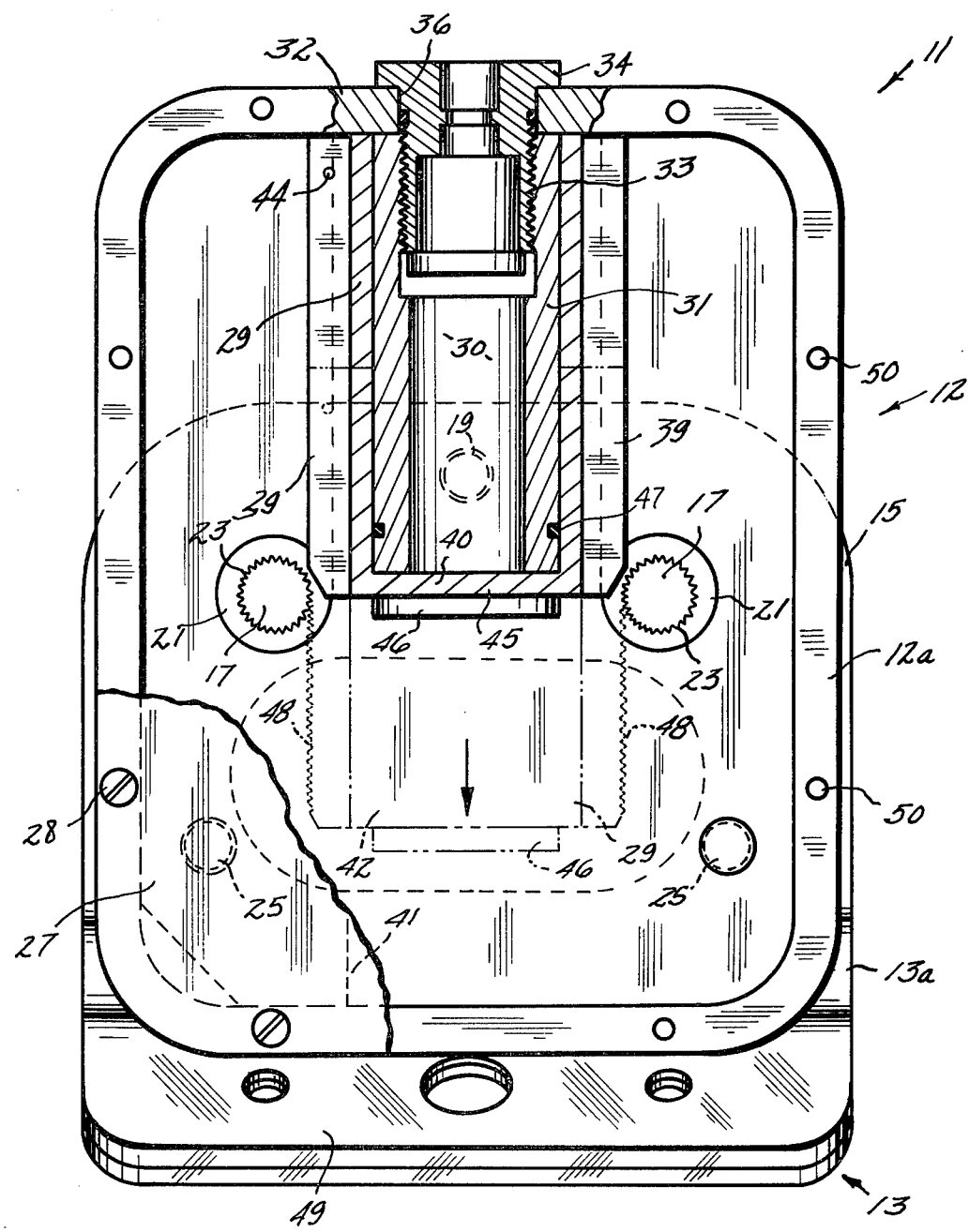
FIG. 3 is an end elevation view of dual spool frame and showing the pretensioner case cut away through the piston, cartridge and chamber and indicating the guide journalling of the piston and showing a stroke of the piston in phantom line and indicating the displacement of metal by the knurled portion of the shafts and the formation of teeth in the piston surfaces.

In FIG. 3 the function of the piston 29 in the pretensioner case 12a is best appreciated with the cartridge 33 firmly but removably in place and with the pyrotechnic contents removed for clarity. Here the shear pin 44 is visible and extending into the case and through the raised lands forming the surfaces 38 and 39. At the lower extremity the land portions of the surfaces 38 and 39 are chamfered to provide a lead of the piston 29 into interference engagement with the knurled portions 23 of shafts 17. When the pyrotechnic contents of the cartridge 33 are initiated, the gases expand into the chamber 30 axially through the sleeve 31 and act against the transverse wall 45 which closes the end of the piston 29. A bumper or buffer plate 46 is secured to the external surface of the wall 45. The O-ring-like seal 47 restricts blow back of gases between the sleeve 31 and piston 29. The arrow in the FIG. 3 on the extended axis of the chamber 30 designates the direction of movement of the piston 29 as the gases expand. The phantom line discloses the deformation of the piston 29 at the surfaces 39 and 38 in the froming of a tooth-like pattern 48 as the movement of the piston 29 imparts positive rotation of the shafts 17 driven at the knurled portions 23. The shafts 17 are hard material such as steel. The material forming the lands and surfaces 38 and 39 are of a softer and deformable material such as aluminum, bronzes, brasses, and even lead and alloys or mixes of these to create the formation of teeth as shown as opposed to stripping or shearing in the interference movement between piston 29 and shafts 17. This is somewhat a function of the drive velocity of the piston 29 and hence dependent upon the selected pyrotechnic charge. The lands and surfaces 38 and 39 may be inserts fixed to the body of the piston 29 or preferably the surfaces 38 and 39 are integral with the piston 29 as shown. As will be appreciated by varying the length of the lands 38 and 39, the effective length of driving stroke may be varied. This would result, for example, by terminating the interference fit between piston 29 and knurls 23 short of the full stroke of the piston 29. It will also be appreciated that where it is desired to lead the reel 16 attached to one of the shafts 17 over the other reel 16, then the interference deformation fit on one side of the piston as seen in FIG. 3 may be caused to achieve positive driving engagement with one shaft 17 ahead of the other. The base or mounting plate 49 of the dual spool retractor 13 is clearly visible and the pretensioner 12 is secured thereto at the flange 15 as by fasteners 25 and the shaft bearings through the pretensioner case 12a and the retractor frame flange 15 are also visible. Through these means stresses generated in the pretensioner 12 are transmitted into the retractor frame 13a and are carried by the base plate 49 into the frame of a vehicle in which the present unit may be used. The cover 27 is appreciated as closing the pretensioner case 12a by attachment thereto by the screws 28 in the perimeter receiving openings 50 as shown. In the event of overrun of the piston 29, the bumper 46 cushions the impact of the piston 29 with the lower wall of the pretensioner case 12a or any selected stop.

When the cartridge 33 is expanded, it is replaced by screwing a new cartridge into the pretensioner case 12a. The piston 29 is also replaced to assure positive engagement in driving the shafts 17. For vehicular use, a new or reconditioned pretensioner 12 is replaceable by simple removal of the pretensioner case 12a from the flange 15 by removal of the bolts 25 and without tampering with the retractor portion 13.

In FIG. 4 the simplicity, compactness, and assembly of the pretensioner 12 for dual spool retractors 13 can be best appreciated. The dual spool retractor 13 with extending shafts 17 in the bearings 21 is shown in simplest and partially assembled form. It will be understood that lock means (not shown) are integrated in the complete dual spool retractor 13 and also spring return or rewind means (not shown) are attached to the reels 16. To this, the pretensioner 12 is attached by bolting the case 12a to the flange 15 by the bolts 25. Inside the case 12a, closed by the attachment of cover 27 by screws 28, is the guided piston 29 poised by the shear pin 44 running into the case 12a and fastened on the tubular sleeve 31 by reason of the removable insertion of the pyrotechnic cartridge 33. The cap 34 of the cartridge 33 is in flanged engagement with the case 12a and the wall 32 and the cartridge 33 is threadably engaged with the tubular sleeve 31 drawing it firmly into contact against the inner surface of wall 32 surrounding opening 36. A gas seal is achieved here and the cartridge 33 is provided with initiator leads 37. The lobe portion 42 of the piston 29 is then in guide relation with the drop portion 41 of the cover 27 as formed by the raised ribs 51 which flank the travel path of the piston 29 and secure the piston 29 in a journal relation against chance cocking or misalignment as it drives the interference surfaces 38 and 39 into deforming contact against the knurled portions 23 of the shafts 17.

In use, the dual spool pretensioner has achieved excellent performance whre it is used with passive restraint harness in rewinding slack in long harness lines at the point of emergency and consequently minimizing the shock to users of webbing where slack or elongation provides hazards. This allows the use of lighter retraction force to maximize user comfort under normal vehicle operating conditions. The simplicity of using a single pretensioner to act on dual spools or reels is unique, and the positive drive through tooth formation deformation of the piston is regarded as innovative. The ease of the unit replacement has made the device attractive in automotive applications and the reconditioning of the unit by substituting a new cartridge and piston has brought about substantial economies. The structure used with dual spool retractors admits of design variants to meet required or selected sequencing or delay without regard to radical revision of the existing dual spool retractors.

Having thus described our invention and one preferred embodiment thereof, others skilled in the art will appreciate changes, modifications and improvements therein and it is the intent that such changes, modifications and improvements be embodied in the spirit of the present invention limited only by the scope of our hereinafter appended claims.

We claim:

1. A pretensioner for turning the spools to tighten webbing thereon for dual spool safety belt retractors comprising:
    a pair of shafts in spaced-apart parallel offset relation, each of said shafts each driving a webbing spool connected thereto and each having a knurled section intermediate the ends thereof;
    a case supporting said shafts for operative journalling and location therein of said knurled sections, said case attachable to a dual spool retractor frame;
    a chamber in said case;
    a pyrotechnic means removably inserted in said chamber; and
    deformable piston means operably engaged against said chamber and alignably journalled between said shafts and having an interference fit with said knurled sections whereby, upon linear movement of said piston, said piston means is deformed and said shafts are rotated, turning said spools and tensioning said webbing.

2. A pretensionable dual spool retractor structure for safety belt webbing comprising:
    a retractor frame;
    a pair of shafts each connected to a webbing spool and support in said frame in journalled spaced-apart relation and said shafts having a knurled portion extending outboard of said frame;
    encasement means attached to said frame and into which said knurled portions extend, said encasement means including journaled guides supporting said shafts;
    a chamber in said encasement means;
    pyrotechnic means removably inserted in said chamber;
    piston means in guided relation in said encasement means and including a cavity aligned with said chamber, said piston means in drivable relation to said knurled portions of said shafts and deformable by passing engagement with said knurled portions of said shafts.

3. In the combination of claim 1 wherein a shear pin secures said piston means in breakaway relation to said case whereby said piston means is normally held out of contact with said knurled section of said shafts.

4. A pretensioner for the spools of dual spool safety belt retractors and tensioning safety belt webbing wound thereon comprising:
    a pair of shafts connected to spools with webbing thereon and in spaced-apart parallel relation, each of said shafts having a knurled section intermediate the ends thereof;
    a case of supporting said shafts for operative journalling and location therein of said knurled sections, said case attachable to a dual spool retractor frame;
    a chamber in said case;
    a pyrotechnic cartridge removably inserted in said chamber; and
    a piston block operably engaged against said chamber and alignably journalled for movement in said case between said shafts and having an interference fit with said knurled sections whereby, upon linear movement of said piston, said shafts are simultaneously rotated and said piston is deformed by said knurled portions.

* * * * *

UNITED STATES PATENT AND TRADEMARK OFFICE
CERTIFICATE OF CORRECTION

PATENT NO. : 4,434,953
DATED : 1984 March 6
INVENTOR(S) : Charles Gemar, Robert L. Meisch It is certified that error appears in the above-identified patent and that said Letters Patent is hereby corrected as shown below:

Column 1, line 38, insert "of" after "runs"

Column 1, line 59, "knursl" should read --- knurls ---

Column 2, line 32, "driectly" should read
--- directly ---

Column 4, line 27, "of" should read --- to ---

Column 5, line 65, "froming" should read --- forming ---

Column 7, line 4, "whre" should read --- where ---

Column 7, line 14, delete "the" (first occurrence)

Column 8, line 7, "support" should read --- supported ---

Column 8, line 34, delete "of" after "case"

Signed and Sealed this

Fourteenth Day of August 1984

[SEAL]

Attest:

GERALD J. MOSSINGHOFF

Attesting Officer

Commissioner of Patents and Trademarks